No. 746,802. Patented December 15, 1903.

UNITED STATES PATENT OFFICE.

CARLETON ELLIS AND OWEN J. FLANIGAN, OF BOSTON, MASSACHUSETTS.

SOLDERING FLUX FOR ALUMINIUM.

SPECIFICATION forming part of Letters Patent No. 746,802, dated December 15, 1903.

Application filed December 31, 1902. Serial No. 137,224. (No specimens.)

*To all whom it may concern:*

Be it known that we, CARLETON ELLIS and OWEN J. FLANIGAN, both of Boston, in the county of Suffolk and State of Massachusetts, have invented certain new and useful Improvements in Soldering Fluxes for Aluminium, of which the following is a specification.

Up to the present time great difficulty has been experienced in the soldering of aluminium owing to the highly repellent action which this metal exhibits toward solders of all kinds. This difficulty is due partly to a film of alumina which coats the surface of the metal and partly to a characteristic property of aluminium—viz., its disinclination to alloy with other metals.

The object of our invention is to overcome the above difficulties by the use of a flux which not only dissolves and removes the coating of alumina, but which also gives to the aluminium an attractive rather than a repellant action toward solders.

The principle involved in our invention is that of using for a flux the heavy metal salts whose heat of formation is less than that of the corresponding salt of the metal to be soldered, combined with a vehicle possessing reducing properties. Such metallic salts when heated in the presence of the vehicle and in contact with the metal to be soldered are reduced by the vehicle and the metal to be soldered to the metallic state, and thus coat or "thermoplate" the metal. On this coated metal the solder flows readily and unites easily to form a perfect metallic contact. In practice the operation of thermoplating is made simultaneously with that of soldering, the flux and solder being applied to the metal at the same time.

Among the metallic salts reacting as heretofore described are the chlorids of mercury and silver. Silver chlorid, for instance, incorporated with the reducing vehicle when heated on a sheet of aluminium gives rise to aluminium chlorid, which volatilizes, and the reduced silver liberated in the nascent state unites with the aluminium, forming an aluminium-silver alloy, over which the solder readily flows. On cooling, the solder will be found to be firmly attached to the aluminium plate. So perfect is the adhesion that two strips of aluminium soldered together in this manner cannot be torn apart at the soldered junction. The aluminium itself will yield first. The other halide salts of silver and those of gold, mercury, and bismuth act in a similar manner. Further, it is not necessary that the metallic salt employed has a heat of reaction less than that of the metal to be soldered if there be present other bodies which by metathesis or otherwise are capable of forming salts having the requisite thermochemical properties. For instance, an equivalent for chlorid of mercury could be a mixture of mercuric acetate and sodium chlorid; an equivalent for fluorid of bismuth could be a mixture of bismuth nitrate and ammonium fluorid or naphthylamin hydrofluorid. These combinations tending to produce equivalents as heretofore stated are in general unsatisfactory and imperfect in action. It is therefore preferable to use directly the salts having the thermochemical properties as heretofore specified. In order to facilitate this thermoplating action, the metallic salt is incorporated with an organic body, which acts as a reducing vehicle. This vehicle may consist of an oil stock, as paraffin-oil or vaseline, in which case the flux takes the form of a paste, or the salt may be incorporated with a molten wax or resin and cast into sticks or pencils. The use of a reducing vehicle for applying the metallic salt is an important feature of this invention. Were the salt of itself without a medium of any sort to be used, its reduction would occur wholly at the expense of the aluminium, causing the latter to become etched and corroded. The vehicle materially aids the thermoplating action by partly or completely reducing the salt to the metallic state, liberating the metal in the nascent form.

What we claim, and desire to secure by Letters Patent, is—

1. The herein-described flux for soldering metals consisting of a salt of a metal whose heat of formation is less than that of the corresponding salt of the metal to be soldered combined with a reducing vehicle, substantially as described.

2. The herein-described flux for soldering aluminium consisting of a salt of a metal whose heat of formation is less than that of the corresponding salt of aluminium combined with a reducing vehicle, substantially as described.

3. The herein-described flux for soldering aluminium consisting of the chlorids of the heavy metals combined with an organic reducing vehicle, substantially as described.

4. The herein-described flux for soldering aluminium consisting of the chlorids of silver combined with an organic reducing vehicle, substantially as described.

5. The herein-described flux for soldering aluminium consisting of the chlorid of silver incorporated with an oil stock substantially as described.

In testimony whereof we have affixed our signatures in the presence of two witnesses.

CARLETON ELLIS.
OWEN J. FLANIGAN.

Witnesses:
F. E. BROOKS,
LAURA J. WALKER.